UNITED STATES PATENT OFFICE.

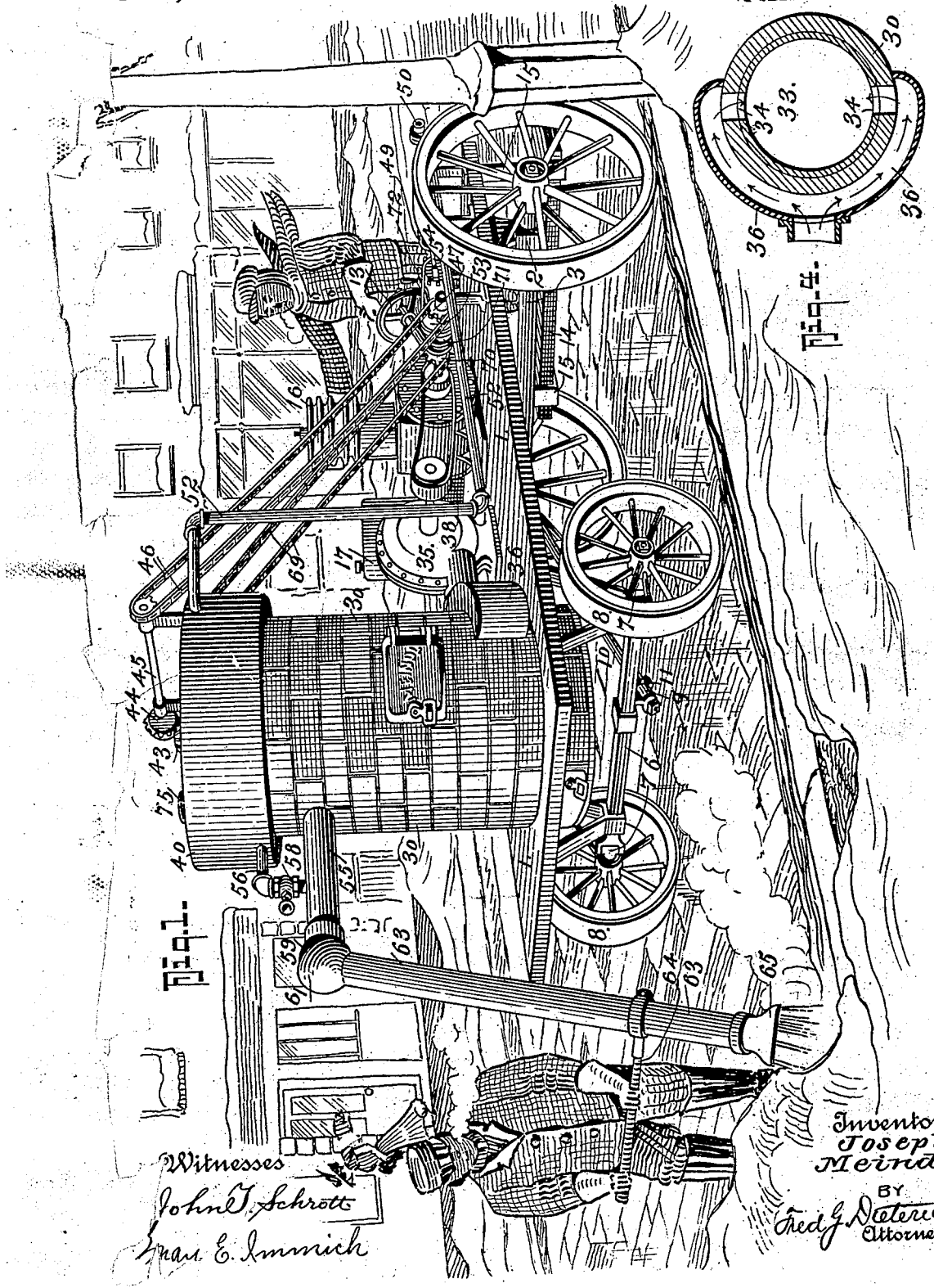

JOSEPH MEINDL, OF OREGON CITY, OREGON.

SNOW-MELTING MACHINE.

980,983.  Specification of Letters Patent.  Patented Jan. 10, 191

Application filed October 8, 1910. Serial No. 586,048.

*To all whom it may concern:*

Be it known that I, JOSEPH MEINDL, residing at Oregon City, in the county of Clackamas and State of Oregon, have invented certain new and useful Improvements in Portable Snow-Melting Machines, of which the following is a specification.

My invention is an improved portable snow melting machine for moving snow and ice from streets, gutters and railroads and in its generic nature the invention includes a wheeled vehicle having a short turn gear operated from the rear platform of the vehicle, a power plant, transmission mechanism between the power plant and the driving wheels of the vehicle, a hot air furnace, a blower driven from the power plant to create a forced draft in the furnace, a brine tank supported on the top of the furnace whereby the contents of the tank will be heated, a water elevator driven from the power plant for supplying the brine tank with water, a pumping mechanism for pumping water into the brine tank, and stirring mechanism for keeping the salt in the brine tank from settling, together with a directing nozzle for directing the heated air and brine onto the snow and ice to melt the same.

In its more subordinate nature, the invention also includes those novel details of construction, combination and arrangement of parts, all of which will be first fully described, then be specifically pointed out in the appended claims, and illustrated in the accompanying drawings, in which:

Figure 1, is a perspective view illustrating my invention in use. Fig. 2, is a top plan view of my apparatus. Fig. 3, is a central vertical longitudinal section on the line 3—3 on Fig. 2. Fig. 4, is a horizontal section on the line 4—4 of Fig. 3. Fig. 5, is an enlarged detail section of the ball and socket joint for the distributing nozzle. Fig. 6, is an enlarged detail vertical section of the upper end of the water elevator.

Referring now to the accompanying drawings in which like letters and numerals of reference indicate like parts in all of the figures, 1 is the platform of the vehicle, in bearing brackets 2 of which the rear driving shaft 3 turns.

The front shaft 6 is stationarily held in bearings 5 and carries the short-turn spindles 7 on which the pilot wheels are mounted and to which the connecting rack rod is secured. The rod 12 meshes with a ge 11 on the steering post 10 whose lower e is mounted in a bearing 9 and whose upp end carries a turn wheel 13, as clearly sho in the drawings.

At the rear of the machine is a platfor 14 supported on brackets 15, on which t driver of the vehicle may stand.

The power plant consists of a gasolene e gine 16, and gasolene tank 17 which is pip up with the engine 16 through piping 1 The engine shaft 19 projects into a tran mission gear case and carries a shiftab clutch member 20. Gears 21—22 are loose mounted on the shaft 19, one at each side the clutch member 20 and are adapted to operatively connected with the shaft by t clutch member 20 which is slid into engag ment with either of the gears 21 22 by lever 26.

A driven shaft 23 carries gears 24—25 mesh respectively with the gears 22—21 an the driven shaft 23 projects out of the gea case (see Fig. 2), and carries a sprocket 2 around which an endless chain 29 passes, th chain 29 also passing around a sprocket 2 on the drive shaft 3 of the vehicle.

30 is the hot air furnace which has a grat 31 on which a fire is built in the fire cham ber 32 and it is also provided with an as box 33 and an air inlet 34 from the annula chamber 36 into which air is forced by th centrifugal pump 35 whose shaft 37 i driven from the power shaft extension 4 of the engine through the medium of sprocket chain 38 which passes around t' sprocket on the shaft 37 and around sprocket 39 on the shaft 48.

40 is the brine tank which is mounte over the furnace 30 whereby the heat of t furnace may keep the brine in the tank warm. In order to prevent settling of t salt, a stirring mechanism is provided a this consists of the shaft 41 carrying pad dles 42 and driven from a countershaft 4 through gears 43 and 44, the shaft 45 re ceiving its motion through a belt or chain 46 that passes over a pulley or sprocket 47 on the shaft 48.

49 is a pump driven from the shaft 48 which carries a loose gear 53 which is adapt ed to be locked to the shaft 48 by a shiftable clu J. MEINDL.
SNOW MELTING MACHINE.
APPLICATION FILED OCT. 8, 1910.
980,983.
Patented Jan. 10, 1911.
2 SHEETS—SHEET 2.
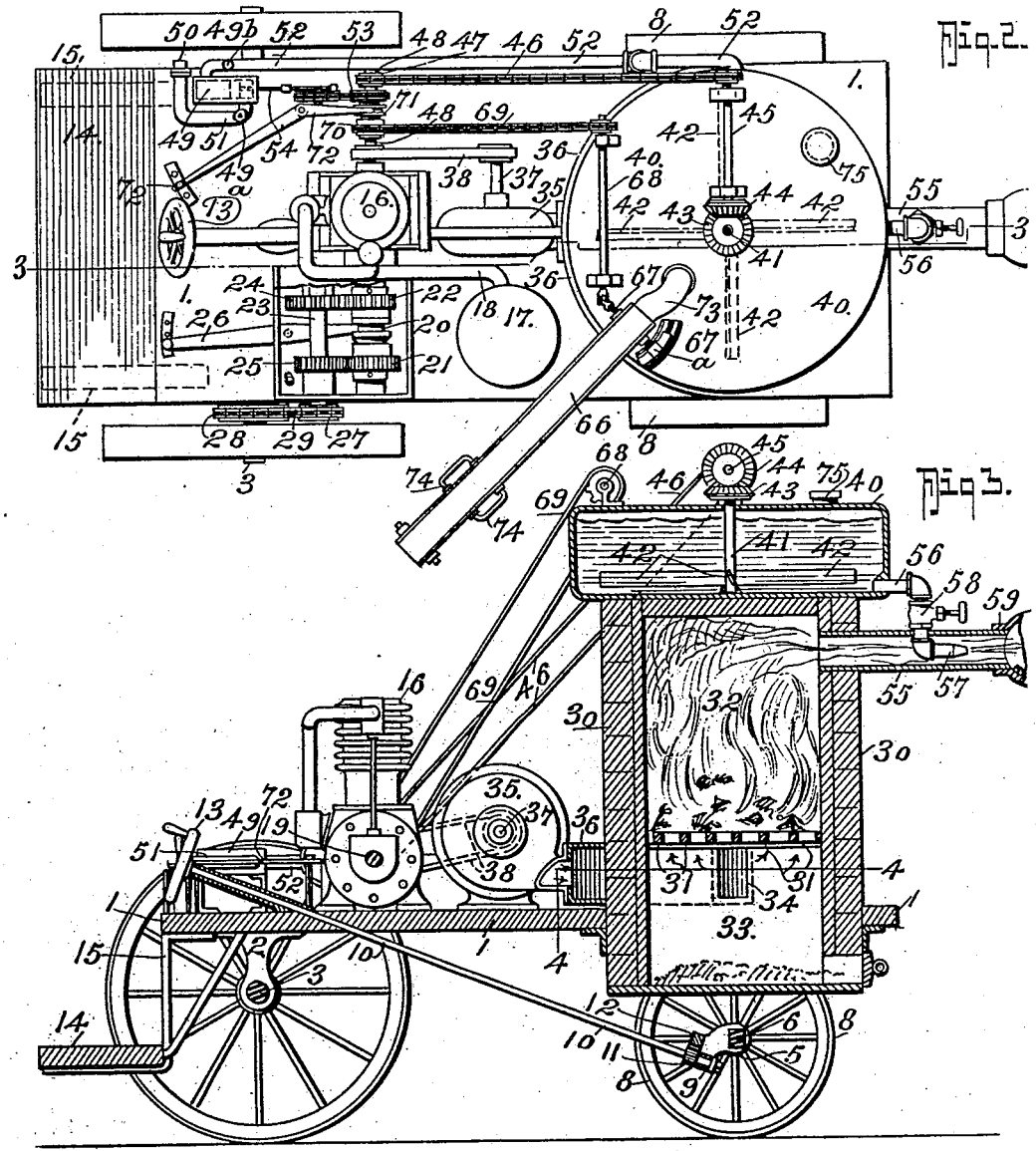
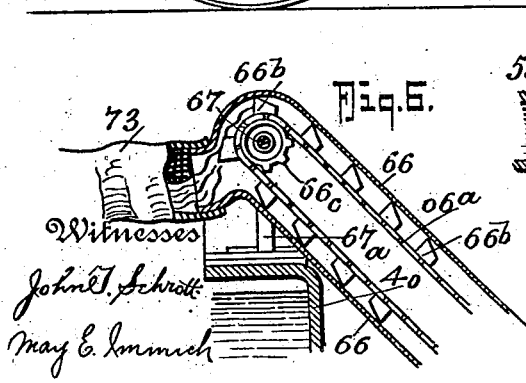
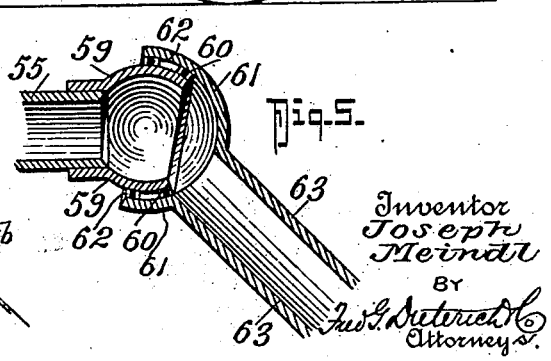
Witnesses
John T. Schrott
May E. Immich
Inventor
Joseph Meindl
By
Fred G. Dieterich
Attorneys The pump 49 has an inlet pipe 51 to which 50 the feed pipe from the source of water supply, (not shown) may be coupled.

52 is a pipe leading from the pump 51 into the brine tank 40, suitable back check valves 49ª—49ᵇ being provided for the pump so as to maintain a uni-directional flow of water. The pump has its rod 54 connected with a crank on a gear that meshes with the gear 53, as clearly shown in Fig. 2. 55 is an outlet flue from the furnace 30 into which the nozzle 57 from the outlet pipe 56 of the brine tank 40 projects, a valve 58 being provided to control the passage of brine from the tank 40 into the pipe 55. The pipe 55 is threaded into one member 59 of a ball and socket joint, the member 59 carrying a packed annular ring portion 60, while the other member 61 of the ball and socket joint has a ring packing 62 to effect a tight joint. The member 61 is carried by a discharge pipe 63 which has a distributing nozzle 65 at one end and may be moved by handle 64 to direct the hot stream against the pile of snow and ice.

Any suitable elevating mechanism may be provided to supply the tank 40 with water or brine and for purposes of illustration, I have indicated an endless chain bucket conveying mechanism shown particularly in Figs. 2 and 6 of the drawings, by reference to which it will be seen that the endless bucket chain conveyer includes a casing 66 in which the endless chain 66ª on which the water elevating buckets 66ᵇ are mounted. The chain 66ª passes over a sprocket 66ᶜ of the shaft 67 on which the casing 66 is mounted the shaft 67 being supported in bearings 67ª on top of the brine tank 40, and is driven from a countershaft 68 that is driven from a loose gear pulley 70 on the shaft 48 through an endless chain or belt 69, the pulley 70 being adapted to be interlocked with the shaft 48 by the clutch 71 when the lever 72 is moved to bring the clutch 71 into engagement with the pulley or sprocket 70.

73 is a flexible connection between the casing 66 at its delivery end and the brine tank 40, whereby the conveyer may deposit the water into the brine tank.

In order that the conveyer 66 may be moved around it is provided with handles 74 and the bearing 67ª is made to have a limited sliding movement. While I have shown this construction of endless conveyer water elevator, I desire it understood that any other suitably constructed water elevator may be used, if desired.

75 designates a covered opening into the tank 40 through which the salt may be deposited, if desired, or the salt solution or brine may be directly pumped or conveyed into the tank 40, either by the pump 49 or In the practical application of my invention, the snow and ice to be melted are preferably shoveled up into piles along the gutter, as shown in Fig. 1 of the drawings. A suitable fire is built in the combustion chamber 32 of the furnace 30 and is kept burning by the draft created from the fan 35. As soon as the fire is started up sufficiently the hot air and gas will pass through the pipe 55 and consequently through the pipe 63 and out through the nozzle 65 which may be directed against the pile of snow and ice, as shown in Fig. 1 of the drawings. By opening the valve 58 more or less brine will be fed into the pipe 63 to mingle with the hot air and thus the combined action of the hot air and brine on the pile of snow and ice will result in a rapid melting of the same, and prevent its refreezing until it has had time enough to flow off into the street sewers, it being understood that the brine lowers the freezing point of the snow and ice to a considerable degree and thereby prevents refreezing under ordinary conditions.

Should the water elevator 66 get out of repair, the clutch 71 may be thrown into engagement with the gear 53 and the pump 49 brought into operation and vice versa.

From the foregoing description taken in consideration with the accompanying drawings, it is thought the complete construction, operation and advantages of my invention will be readily understood by those skilled in the art to which the invention appertains.

It should be understood that the apparatus may be made of any size that may be desired.

What I claim is:

1. In an apparatus of the class described, a wheeled vehicle, a power plant mounted on the same, a hot air furnace mounted on said vehicle, means driven from said power plant for creating a draft through said furnace, an off-take from said furnace, a discharge pipe connected to said off-take, a nozzle on said pipe, a brine tank supported over said furnace, a valved pipe connection between said brine tank and said off-take, and means driven from said power plant for agitating the brine in the brine tank.

2. In an apparatus of the class described, a wheeled vehicle, a power plant mounted on the same, a hot air furnace mounted on said vehicle, means driven from said power plant for creating a draft through said furnace, an off-take from said furnace, a discharge pipe connected to said off-take, a nozzle on said pipe, a brine tank supported over said furnace, a valved pipe connection between said brine tank and said off-take, means driven from said power plant for agitating the brine in the brine tank, and means driven from said power plant for conveying water to said brine tank.

3. In an apparatus of the class described, a wheeled vehicle, a power plant mounted on the same, a hot air furnace mounted on said vehicle, means driven from said power plant for creating a draft through said furnace, an off-take from said furnace, a discharge pipe connected to said off-take, a nozzle on said pipe, a brine tank supported over said furnace, a valved pipe connection between said brine tank and said off-take, means driven from said power plant for agitating the brine in the brine tank, and means driven from said power plant for driving said vehicle.

4. In an apparatus of the class described, a wheeled vehicle, a power plant mounted on the same, a hot air furnace mounted on said vehicle, means driven from said power plant for creating a draft through said furnace, an off-take from said furnace, a discharge pipe connected to said off-take, a nozzle on said pipe, a brine tank supported over said furnace, a valved pipe connection between said brine tank and said off-take, means driven from said power plant for agitating the brine in the brine tank, and means driven from said power plant for conveying water to said brine tank, and means driven from said power plant for driving said vehicle.

5. In an apparatus of the class described, a wheeled vehicle, a power plant including an engine mounted on said vehicle, transmission gearing between said engine and the drive wheels of said vehicle, a steering mechanism for said vehicle, a furnace carried on said vehicle, a pump for effecting a forced draft in said furnace, means for driving said pump from said engine, an outlet from said furnace, a discharge pipe and nozzle swivelly connected to said outlet, a brine tank mounted on said furnace, a valved pipe connection between said brine tank and said outlet, a stirring mechanism in said brine tank, power transmission mechanism between said stirring mechanism and said engine, a pump for pumping water into said brine tank, power transmission mechanism between said engine and said pump, a water elevator for conveying water into said brine tank, power transmission mechanism between said water elevator and said engine, and a clutch device for bringing either said pump power transmission or said water elevator power transmission mechanism into operative connection with said engine.

JOSEPH MEINDL.

Witnesses:
FRED J. MEINDL,
GUS. C. MATER.